United States Patent [19]

Krieg

[11] Patent Number: 5,265,712
[45] Date of Patent: Nov. 30, 1993

[54] METHOD AND APPARATUS FOR TAKING UP ARTICLES

[75] Inventor: Walter Krieg, Brügg, Switzerland
[73] Assignee: Digitron AG, Brugg, Switzerland
[21] Appl. No.: 988,466
[22] Filed: Dec. 10, 1992

[30] Foreign Application Priority Data

Dec. 23, 1991 [CH] Switzerland .................. 3827/91

[51] Int. Cl.$^5$ ............................................ B65G 65/02
[52] U.S. Cl. ...................................... 198/512; 414/528
[58] Field of Search ............... 198/512; 414/278, 398, 414/528, 659

[56] References Cited

U.S. PATENT DOCUMENTS

| | | | |
|---|---|---|---|
| 3,580,375 | 5/1971 | Nunes, Jr. ........................ | 198/512 |
| 3,819,068 | 6/1974 | Weir .................................. | 198/512 X |
| 4,281,955 | 8/1981 | McWilliams ...................... | 414/398 |

FOREIGN PATENT DOCUMENTS

| | | |
|---|---|---|
| 1907109 | 9/1970 | Fed. Rep. of Germany . |
| 0044984 | 4/1977 | Japan .................................. 414/278 |
| 1276070 | 6/1972 | United Kingdom . |
| 2205300 | 12/1988 | United Kingdom . |

*Primary Examiner*—D. Glenn Dayoan
*Attorney, Agent, or Firm*—Fish & Richardson

[57] ABSTRACT

The apparatus is used for picking up arbitrary, especially heavy, articles. It includes a receiving table and an auxiliary pickup member located above the receiving table. A roller-like pickup member is arranged at the front end of the receiving table for exerting a lifting force to a vertical surface or front face of an article to be picked up. The auxiliary pickup member applies a second, horizontal force to the top side of the article. In this way a torque is generated, which supports tilting and lifting the article.

11 Claims, 3 Drawing Sheets

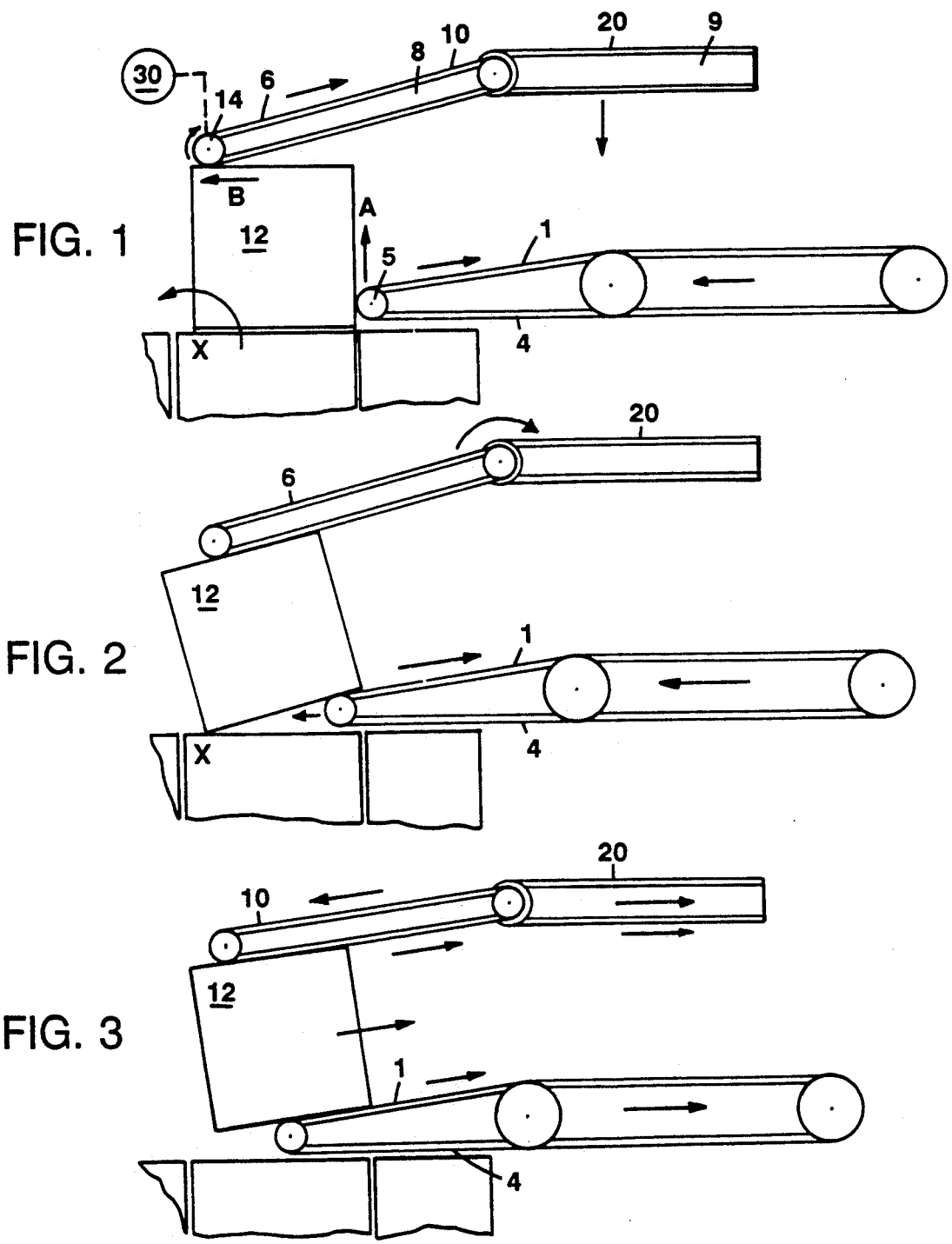

METHOD AND APPARATUS FOR TAKING UP ARTICLES

BACKGROUND OF THE INVENTION

1. FIELD OF THE INVENTION

The present invention relates to a method for taking up articles from a supporting surface by means of a horizontally displaceable receiving table comprising a driven transporting device and a roller-like pickup member for engaging a vertical surface of the article and an auxiliary pickup member located above said receiving table. The invention also relates to an apparatus comprising such a receiving table and such an auxiliary pickup member.

2. DESCRIPTION OF THE PRIOR ART

An apparatus for picking up books of the above type is described in the German publication DE 37 33 461. The apparatus comprises a holding member for preventing light books from being pushed away while they are picked up.

This apparatus is not suited for taking up or putting down packages of various shapes from/to the floor or from/to stacks, as they can e.g. be found in the store room of a wholesaler. Heavy articles are especially difficult to handle since considerable forces are required for picking them up. Due to insufficient frictional contact, the pickup member is not always able to exert such forces.

Frictional contact cannot be improved arbitrarily by increasing the pressure of the pickup member against the surface of the article without running the risk of damaging the article or package.

Another apparatus for taking up articles is described in GB 1 276 070. In addition to a holding member this apparatus comprises an upper guiding member with running belts for preventing articles from falling off the receiving table during pickup. Same as in the apparatus discussed above, the force for lifting the article must be generated by the pickup member alone. This can lead to damaging heavy articles.

SUMMARY OF THE INVENTION

Hence, it is a general object of the present invention to provide a method and an apparatus for picking up articles that is suitable for quickly taking up articles of various shapes and also heavy articles without damaging them.

In the method according to the invention the auxiliary pickup member is used to exert a torque to the article. This torque is applied at the top side of the article while the pickup member of the receiving table is operated to tilt and lift the article by exerting a force to a vertical front surface. The torque exerted by the auxiliary pickup member is directed to support the tilting movement of the article.

In this way the total force required to tilt and lift the article at its front side onto the receiving table can be divided into two forces applied to the article at two different locations. Therefore, a stronger tilting torque can be generated and heavier articles can be picked up without being damaged.

In a preferred embodiment the auxiliary pickup member comprises a conveyer belt, which not only supports the pickup procedure but also the transport of the article on the receiving table. In this way the article can be accelerated faster and higher transport speeds can be reached.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 illustrates the pickup procedure;

FIG. 2 shows the apparatus while it is advancing below the article;

FIG. 3 shows the apparatus while the article is being transported over the receiving table;

DESCRIPTION OF A PREFERRED EMBODIMENT

Figure 4:
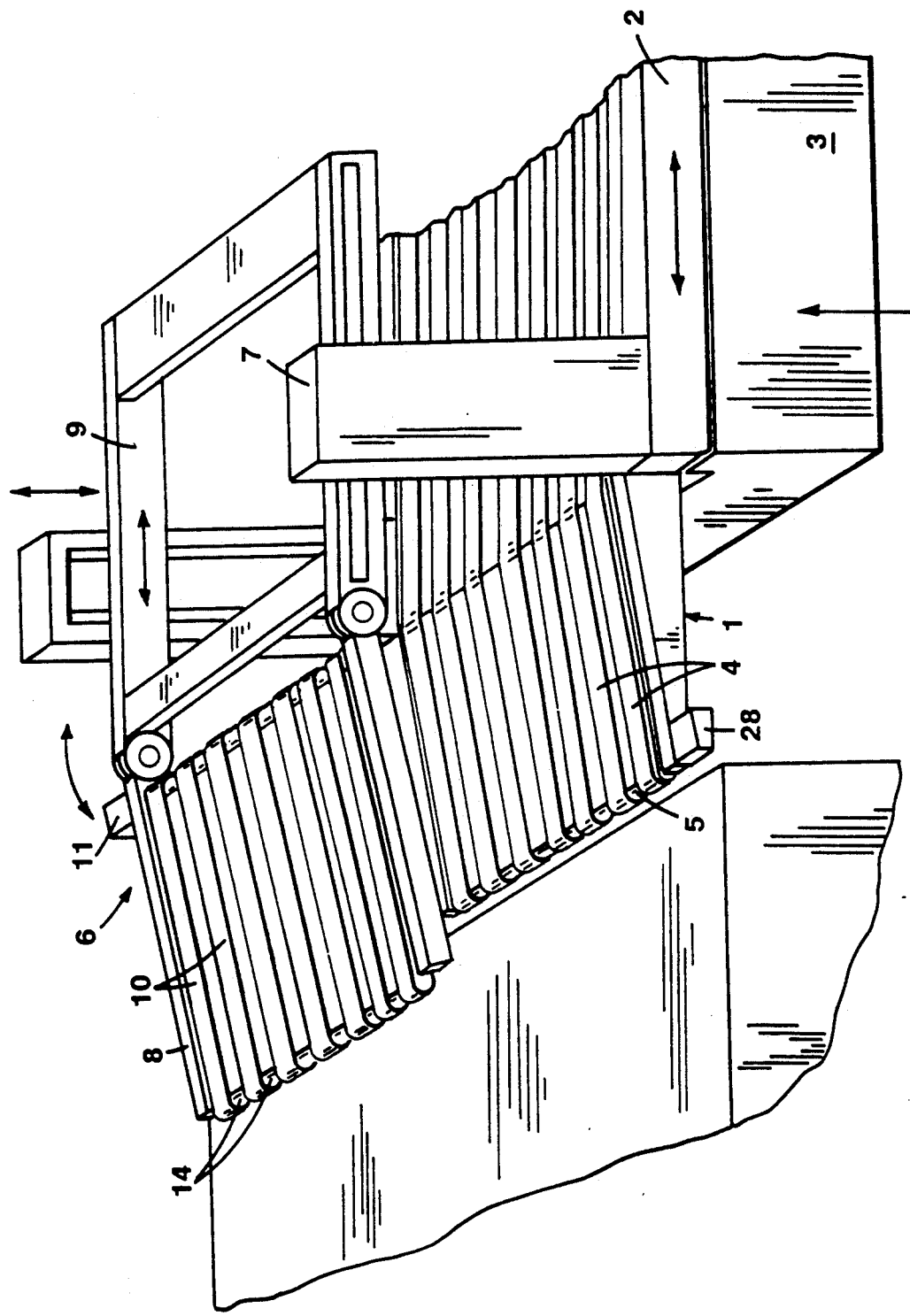
FIG. 4 is a view of part of the apparatus with the receiving table and the auxiliary pickup member.

A first embodiment of the apparatus is shown in FIG. 4 in perspective view. It comprises a receiving table 1, which is horizontally displaceable by means of a sled 2. The sled 2 is disposed on a platform 3. This platform 3 can be displaced vertically and is mounted e.g. on an automated vehicle or on the floor. The apparatus can also be part of a automated storage system in a warehouse.

Circumferential conveyer belts 4 forming a transporting device are arranged on the receiving table. They are guided over a forward guide roller 5 which acts as a pickup member for the article. The diameter of this roller 5 essentially defines the height by which the article must be lifted during pickup. In a preferred embodiment a roller with a small diameter is therefore used.

The sled 2 of the receiving table 1 and the conveyor belts 4 are preferentially driven separately. In this way the conveyor speed can be adjusted and changed independently from the speed of displacement of the receiving table.

An auxiliary pickup member 6 is located above the receiving table 1. In the present embodiment, the auxiliary pickup member is horizontally as well as vertically displaceable and mounted on supports 7 on the sled 2. The auxiliary pickup member 6 comprises an upper table 8. This upper table 8 can be lowered onto the article to be picked up, as it can e.g. be seen from FIG. 1. Preferentially, the upper table 8 is pivotably mounted on a support frame 9, which is arranged on the supports 7. The upper table 8 is also provided with conveyor belts 10 or a similar transporting device. These belts 10 can be driven in both directions by means of a drive 11. At the front edge of the auxiliary pickup member the conveyor belts 10 are guided on rollers 14, which engage the top side of the article. The conveyor belts 10 can cooperate with an additional set of belts 20 in the zone of the support frame 9, as can be seen from FIGS. 1-3.

The embodiment shown in FIG. 4 can of course be modified within the limits given by the following description of its operation.

FIGS. 1-3 show the subsequent steps of the take up procedure, which will be described in the following in detail.

First, the vertical position of platform 3 is adjusted such that the receiving table 1 is located in front of the lower part of a vertical surface or front face of the article 12. The receiving table should have a minimum distance to the support the article is resting on or to a next lower layer of articles, respectively. In this position the receiving table 1 is advanced horizontally towards the vertical surface of the article 12. The speed of the horizontal displacement is decreased shortly before or upon touching the vertical surface of the article. Sensors (e.g. position sensor 28, FIG. 4) can be provided on the receiving table 1 if the position of the article 12 is not known in advance.

In the phase shown in FIG. 1 the receiving table 1 is touching the vertical surface of the article at a decreased horizontal speed. Simultaneously, the conveyor belts 4 and/or the rollers 5 are rotated at a high speed. Upon touching the article 12, the rollers 5 or the belts 4 thereby exert a vertical frictional lifting force on the article 12, as it is indicated by arrow A in FIG. 1.

Before the rollers 5 or belt 4 touch the front face of the article, the auxiliary pickup member 6 and its rolls 14 are lowered onto the article from above. They are positioned such that they come into contact with the rear end of the top side of the article 1, i.e. with the end of the top side that lies farthest away from the vertical surface contacted by the receiving table. The vertical pressure of the rolls 14 on the article is adjusted by means of force sensors (e.g. force sensor 30, FIG. 1, or force sensor 30', FIG. 5) which control the vertical movements of the upper table 8. In this way the article 12 is pressed down at its rear side with a defined force. Therefore the frictional contact at the bottom side the article is increased. At the same time, the conveyor belts 10 and the rollers 14 of the auxiliary pickup member 6 are driven such that a horizontal force is exerted to the top side of the article. This force is oriented towards the rear side of the article, as it is shown by arrow B in FIG. 1. Instead of or additional to the movement of the conveyor belts 10 and the rollers 14, the upper table 8 can be displaced horizontally to support or generate this force B.

The horizontal force B is exerted synchronously with the vertical force A caused by the receiving table. Both forces give rise to an additive torque about an axis X at the rear bottom edge of the article. This torque causes the article to be tilted backwards about this edge. By this tilting movement the vertical front face of the article rises above the receiving table, as it is shown in FIG. 2. In this way even heavy articles can be picked up easily and quickly without being damaged.

Once the vertical front face of the article is lifted above the receiving table (FIG. 2), the receiving table is advanced under the article. In this phase, the horizontal speed of the receiving table and the horizontal speed of the belts 5 are adjusted to be exactly opposite. In this way, the article 12 is essentially not displaced horizontally in respect to its support during this pickup phase, until it is completely supported by the receiving table.

While the receiving table advances under the article, the rollers 14 and belts 10 of the auxiliary pickup member 6 are standing still, preventing the article from being overturned. This is especially important for high articles with a small bottom face. The upper table 8 can be pivoted and displaced such that it is aligned parallel to the receiving table at a distance given by the height of the article.

When the article is completely supported by the pickup table, which can e.g. be monitored by means of a sensor, the conveyor belts 4, 10, and 20 of the receiving table 1 and the auxiliary pickup member 6 are driven to transport the article 12, as it is shown in FIG. 3. At the same time the receiving table 1 is pulled back. Since the article 12 is held at its top and bottom side during this phase, it can be accelerated quickly. In this way a high transport speed can be used. Again, this is especially important for preventing high articles with a small bottom side from toppling over.

Figure 5:
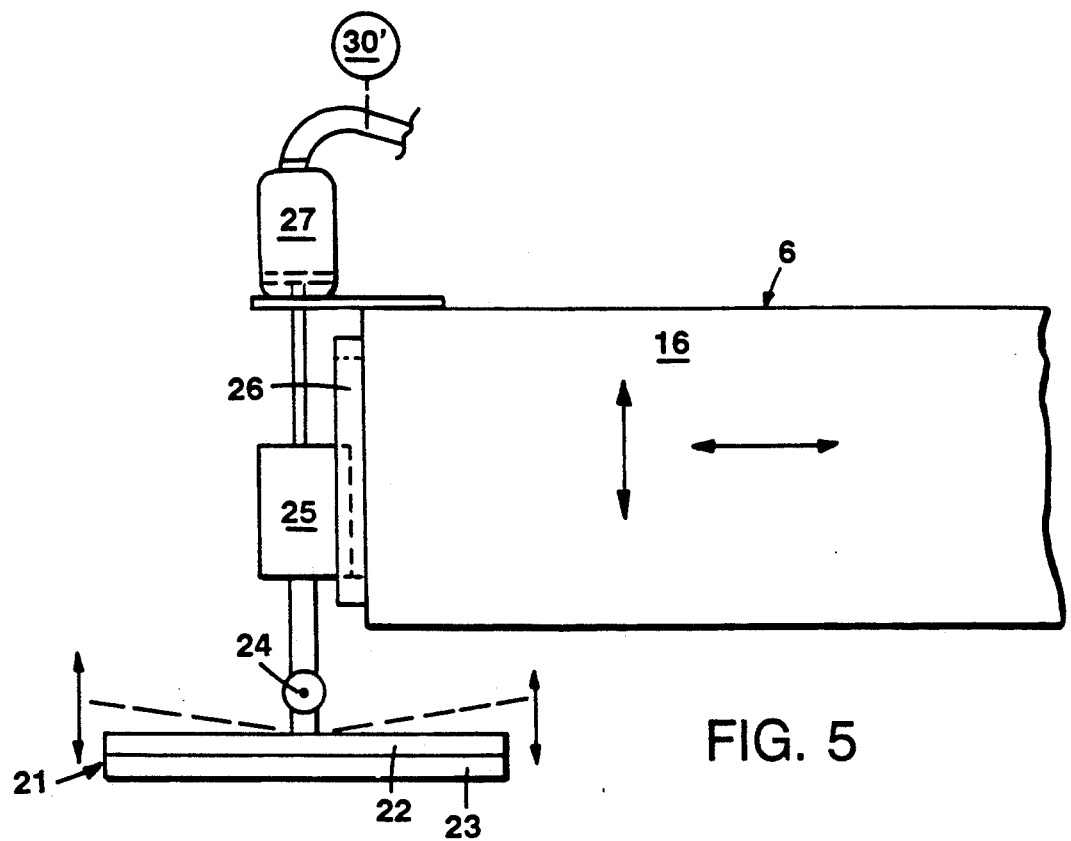
FIG. 5 shows another embodiment of an auxiliary pickup member.

FIG. 5 shows a further embodiment of the head of the auxiliary pickup member. Instead of the guiding rollers 14 and the upper table 8, a pressing plate 21 is provided on an arm 16 to contact the top side of the article. The plate 21 comprises an upper plate 22 and a synthetic rubber plate 23. It is connected via a joint or a hinge 24 to a sled 25, which is sliding along a vertical rail 26 and held by a pneumatic spring 27.

In operation the plate 21 is lowered on the rear side of the article by means of the arm 16 of the auxiliary pickup member 6. Then it is displaced horizontally towards the rear side of the article to exert the horizontal force B, as it was already described in connection with FIGS. 1-3. The joint 24 allows the plate 21 to follow the tilting movement of the article. The rubber layer 23 forms the interface to the article and is designed to engage as many points as possible of an uneven top surface of the article. The sled 25 is pressed down with a force that is independent of its position and can e.g. yield up to 50 mm. The force generated by the pneumatic spring can be adjusted to the nature of the packets to be picked up. In this way even packets with a very uneven and weak surfaces can be picked up, such as plastic bottles wrapped in plastic foil.

The driving and controlling mechanisms used in this apparatus are known to someone skilled in the art. The automated process of picking up an article is essentially controlled by sensors measuring distances and/or forces. If the apparatus is part of an automatic warehouse system, it can be provided with a known image processing control for recognizing the contours of the articles and for controlling the pickup process.

Furthermore, the apparatus can also be used for a controlled setting down of the articles.

All in all, the apparatus is able to pick up arbitrary, even large, heavy or sensitive articles and parcels. Since the article is engaged at two points simultaneously, the pick-up are forces distributed in a better way. This reduces e.g. the danger of damaging a sensitive packaging. Since the conveyor belts 10 and the plate 21 adjust themselves to uneven surfaces, even very irregularly shaped articles can be picked up.

While there are shown and described present preferred embodiments of the invention, it is to be distinctly understood that the invention is not limited thereto, but may be otherwise variously embodied and practiced within the scope of the following claims.

I claim:

1. An apparatus for taking up an article from a supporting surface by means of an apparatus comprising a receiving table, which receiving table is horizontally displaceable in at least one direction of displacement and comprises a top surface, a first transporting device for transporting said article along said receiving table, and at least one roller-like pickup member located at an end of said receiving table facing said direction of displacement, and further comprising an auxiliary pickup member located above said receiving table, said method comprising the steps of displacing said receiving table towards said article to bring said roller-like pickup member into contact with a vertical surface of said article, while lowering said auxiliary pickup member from above onto said article to bring said auxiliary pickup member into contact with a top side of said article, and driving said roller-like pickup member during a pick-up-phase in order to tilt said article by lifting it at said vertical surface onto said top surface of said receiving table while actuating said auxiliary pickup member to exert a force to the top side of said article, which force is directed away from said apparatus, thereby exerting a torque to said article which, in combination with said driving of the roller-like pickup member, facilitates titling of said article.

2. The method of claim 1, wherein said auxiliary pickup-member is horizontally and vertically displaceable in respect to said receiving table, and wherein after lifting said article at said vertical surface onto said top surface of said receiving table, said receiving table and said first transporting device are driven with opposite velocities until said article is supported substantially by said receiving table, while said auxiliary pickup member remains stationary in horizontal direction with respect to said supporting surface.

3. The method of claim 2, wherein said auxiliary pickup member further comprises a second transporting device for said article, and wherein, when said article is supported substantially by said receiving table, said first and said second transporting devices are driven synchronously for transporting said article over said receiving table.

4. An apparatus for taking up an article from a supporting surface comprising
a receiving table being horizontally displaceable in at least one direction of displacement, having a top surface, a first transporting device for transporting said article along said receiving table, and a roller like pickup member located at an end of said receiving table facing said direction of displacement for engaging and lifting a vertical surface of said article, and
an auxiliary pickup member located above said receiving table, which pickup member is displaceable for being lowered onto a top side of said article from above and actuatable to exert a force with non-zero horizontal component away from said apparatus to said top side of said article, thereby providing a torque which facilitates lifting of said vertical surface of said article.

5. The apparatus of claim 4, wherein said auxiliary pickup member comprises at least one roller for engaging said top side of said article, which roller is driven in a first rotational direction for lifting said vertical surface and in a second rotational direction for transporting said article along said receiving table.

6. The apparatus of claim 5 wherein said auxiliary pickup member comprises a second transporting device with at least one transporting belt guided around said roller for engaging said top side of said article.

7. The apparatus of claim 6 wherein said auxiliary pickup member is arranged on an upper table, said at least one transporting belt being guided around said upper table, the horizontal and vertical position of said upper table being adjustable in respect to said receiving table.

8. The apparatus of claim 7 wherein said upper table is displaceable to a position parallel to said top surface of said receiving table, in which position said first and said second transporting devices are driven synchronously for transporting said article over said receiving table.

9. The apparatus of claim 4 wherein said auxiliary pickup member comprises at least one horizontally and vertically displaceable plate-like member for engaging said top side of said article.

10. The apparatus of claim 4 wherein said auxiliary pickup member comprises at least one sensor for determining the pressure force of said auxiliary pickup member exerted onto said top side of said article and a vertical drive for changing said force, which drive is controlled by said sensor.

11. The apparatus of claim 4 wherein said receiving table comprises at least one sensor for determining the relative position of the article in respect to said receiving table.

* * * * *

UNITED STATES PATENT AND TRADEMARK OFFICE
CERTIFICATE OF CORRECTION

PATENT NO. : 5,265,712

DATED : November 30, 1993

INVENTOR(S) : Walter Krieg

It is certified that error appears in the above-identified patent and that said Letters Patent is hereby corrected as shown below:

Col. 4, claim 1, line 56, "An apparatus" should be --A method--.

Signed and Sealed this

Nineteenth Day of July, 1994

BRUCE LEHMAN

Attest:

Attesting Officer

Commissioner of Patents and Trademarks